United States Patent [19]

Doppenberg

[11] Patent Number: 4,932,514
[45] Date of Patent: Jun. 12, 1990

[54] EGG SPREADING TRAY

[75] Inventor: Gerrit Doppenberg, Barneveld, Netherlands

[73] Assignee: Terpa Poultry B.V., Amstelveen, Netherlands

[21] Appl. No.: 229,777

[22] Filed: Aug. 5, 1988

Related U.S. Application Data

[63] Continuation of Ser. No. 52,031, May 20, 1987, abandoned.

[30] Foreign Application Priority Data

May 22, 1986 [NL] Netherlands .................... 8601304

[51] Int. Cl.$^5$ .............................................. B65G 47/12
[52] U.S. Cl. ...................................... 198/445; 198/458
[58] Field of Search ................................ 198/443–446, 198/458

[56] References Cited

U.S. PATENT DOCUMENTS

| | | | |
|---|---|---|---|
| 791,243 | 5/1905 | Carlson | 198/446 |
| 2,679,309 | 5/1954 | Reading | 198/446 |
| 3,095,960 | 7/1963 | Luginbuhl | 198/444 |
| 3,428,161 | 2/1969 | Niederer | 198/445 |
| 4,276,977 | 7/1981 | Van Kattenbroek | 198/445 |

Primary Examiner—Joseph E. Valenza
Attorney, Agent, or Firm—Marvin Feldman

[57] ABSTRACT

An egg spreading track comprising a carrying surface forming part of one or more endless belts, baffles dividing at least a part of the width of said carrying surface into a plurality of discharge tracks extending along at least a part of the length of said carrying surface, as well as at least one cross member arranged directly above said carrying surface. At least two side baffles converging in the direction of movement of said carrying surface are provided above said carrying surface, upstream of said cross member; said converging side baffles adjacent said cross member pass into side baffles diverging mutually in the direction of movement of said carrying surface.

12 Claims, 2 Drawing Sheets

EGG SPREADING TRAY

This is a continuation of co-pending application Ser. No. 052,031 filed on May 20, 1987, now abandoned.

This invention relates to an egg spreading track comprising a carrying surface forming part of one or more endless belts, baffles dividing at least a part of the width of said carrying surface into a plurality of discharge tracks extending along at least a part of the length of said carrying surface, as well as at least one cross member arranged directly above said carrying surface.

A similar egg spreading track is known from Dutch patent application No. 7704938 (published application 177,970). In this known egg spreading track, eggs are brought from one or more feed belts onto a carrying surface forming part of an endless conveyor roller. The eggs are carried along by said surface, thereby contacting a cross member arranged above said carrying surface. The eggs will move in the direction of movement of said surface to against said cross member and then roll along said cross member until successive eggs press them over said cross member. Due to the rolling movement of the eggs in front of the cross member, the eggs will be distributed over the entire width of the carrying surface. The known egg spreading track thus ensures a sufficiently uniform distribution of the eggs behind the cross member and in the different discharge tracks linking up therewith.

The known egg spreading track, however, has the drawback that, in the event of too irregular a distribution of the supply of eggs over the width of the carrying surface, there is obtained an insufficiently uniform distribution of the eggs over the discharge tracks. Such a highly irregular distribution of the supply over the width of the carrying surface may occur e.g. when the eggs are placed always in the same place and not over the entire width on a feed belt leading to the egg spreading track. Another cause may be that the feed belt supplying the eggs to the spreading track makes a bend, where the eggs will tend to rest on that part of the belt which is closest to the outside bend. In many cases, the eggs will be supplied to the egg spreading track by more than one feed belt. In such a case too, when the egg densities on the various feed belts differ strongly, the eggs will be distributed irregularly on the carrying surface and hence over the discharge tracks.

An irregular distribution of the eggs over the discharge tracks leads to loss of capacity and, moreover, increases the chance of breakage.

It is an object of the present invention to remove these drawbacks.

To that end, according to the present invention, an egg spreading track of the above described type is characterized in that at least two side baffles converging in the direction of movement of the carrying surface are arranged above said carrying surface, upstream of the cross member.

By using the mutually converging side baffles, the eggs from the belt portion having the highest egg density are mixed with the eggs from a belt portion having a lower egg density, thereby producing a more homogeneous egg density over the width of the carrying surface adjacent the cross member. This also applies when the eggs are transported from more than one feed belt onto the carrying surface. The egg streams from the different feed belts will intermix under the influence of the converging side baffles.

According to a further embodiment of the present invention, one or more guide strips are provided between the converging side baffles and above the carrying surface, said strips defining two or more conveyor lanes. Preferably, said guide strips are adjustable, so that the angle between their longitudinal axes and the direction of movement of the carrying surface is adjustable. The guide strips are adapted to support the converging effect of the side baffles, thereby guiding the eggs in such a manner that the sub-streams intermix smoothly without the risk of breakage. By varying the adjustment of the guide strips, it is possible to control the extent of mixing of the sub-streams.

According to a preferred embodiment of the present invention, the converging side baffles continue divergently downstream of the cross member, as viewed in the direction of movement, and steering strips directed obliquely outwards and defining transporting tracks are arranged between the divergent side baffles.

By using the divergent side baffles and steering strips, the eggs can again be spread over the entire width of the carrying surface. The entire width of the carrying surface is then effectively filled with eggs, so that there is no loss of capacity and there is also obtained a uniform distribution.

One embodiment of the present invention will now be described, by way of example, with reference to the accompanying drawings, in which.

Figure 1:
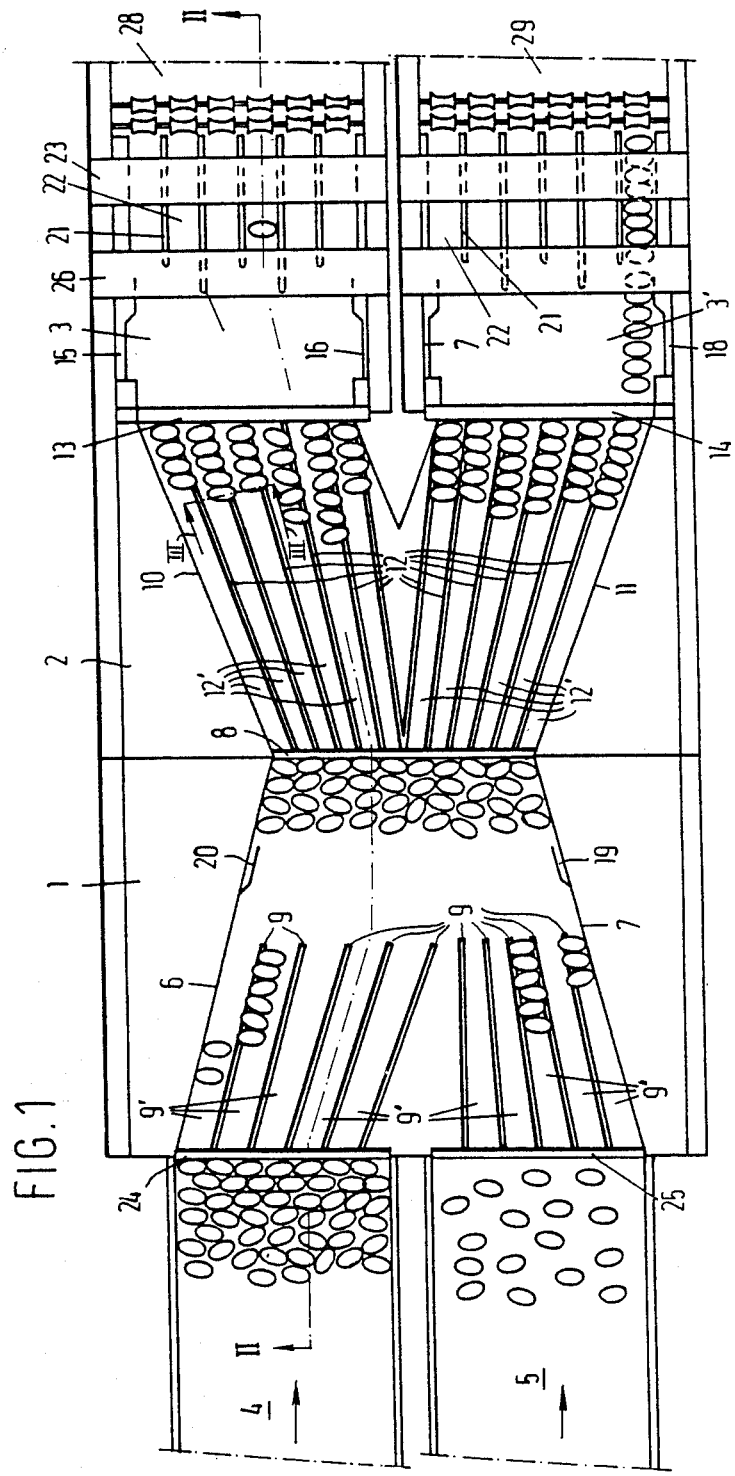
FIG. 1 is a top view of the egg spreading track according to the present invention.
Figure 2:
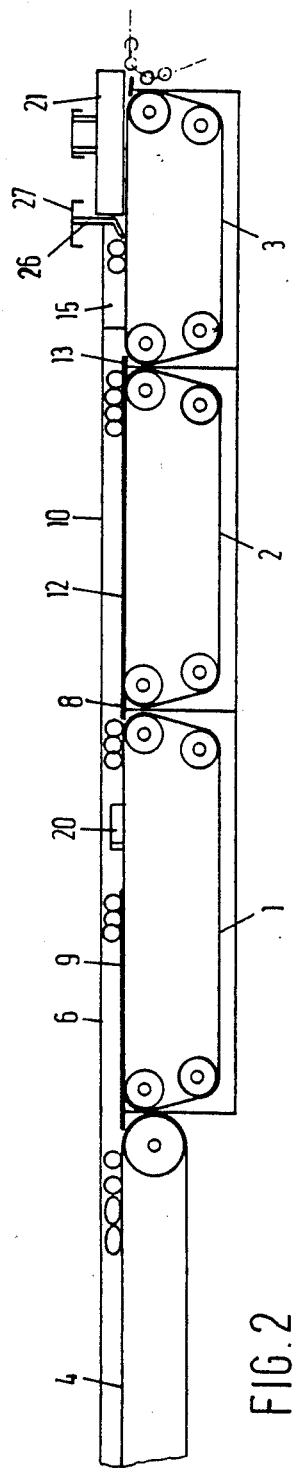
FIG. 2 is a cross section of the egg spreading track of FIG. 1 on the line II—II.

The carrying surface of the egg spreading track shown in FIG. 1 is formed by four endless conveyor belts 1, 2, 3 and 3'. Provided between belts 1 and 2, 2 and 3, and 3', respectively, are transition strips 8, 13, 14, with their top faces at the level of the top faces of the conveyors.

The eggs are supplied to the carrying surface, i.e. the conveyor belts in known manner by, in the present case two, feed belts 4, 5. Arranged above the conveyor belt are two side baffles 6, 7 converging mutually in the direction of movement of the conveyor. Side baffles 6, 7 urge the two egg streams from the feed belts 4, 5 to intermix with the density of the eggs in belt 4 being much higher than that of belt 5. Transition strip 8, positioned transverse to the direction of movement of the belts, is arranged in this case as a cross member with its top face slightly above the top face of conveyor roller 1, thus functioning at the same time as a distributor strip. Distributor strip 8 holds up the eggs in some degree so that they will roll along said strip 8 under the influence of conveyor roller 1, which is pulled underneath the eggs, thereby producing an optimum mixing of the eggs before these are pressed over distributor strip 8 by eggs coming behind them.

Disposed between the converging side baffles 6, 7, above conveyor roller 1, are guide strips 9. Guide strips 9, extending convergingly, define conveyor lanes 9' and, like side baffles 6, 7, guide the eggs in these lanes 9' to move in a converging path. Owing to the use of the guide strips 9, it is prevented that only side baffles 6, 7 will have to orient the egg streams inwardly, in which case the eggs would accumulate against the side baffles and a substantial pressure would be exerted on them by the eggs coming up from behind with increased risk of breakage.

Guide strips 9 have one end attached to transition strips 24, 25 provided between conveyor belt 1 and feed belts 4, 5. Preferably, guide strips 9 are connected to said transition strips 24, 25 for pivotal movement about a vertical axis. In that case, the angle between the guide strips and the direction of movement of conveyor roller 1 can be adjusted. In this manner, the egg streams from feed belts 4, 5 can be mixed to a greater or lesser extent by having the streams intersect each other entirely or partly.

Guide strips 9 are flat and are positioned just above conveyor roller 1. When jamming occurs in a lane between two guide strips, one or more eggs can be pushed by eggs behind them over a guide strip into an adjacent lane, if this has more room. The guide strips thus function likewise as distributor strips and promote a homogeneous distribution of the eggs over the width of the egg spreading track.

Feelers 19, 20 are provided against side baffles 6, 7. In the event of excessive congestion above the portion of the carrying surface disposed between the converging side baffles, this is detected by feelers 19, 20 and then will subsequently stop feed belts 4, 5 temporarily by control means, not shown, or reduce their speed until the congestion has been removed.

The eggs can be guided from the converging portion and the distribution strip 8 directly towards the various discharge tracks. In many cases, however, it will be desirable for the eggs meanwhile distributed more uniformly to be spread again over the entire width of the carrying surface. To that end, the egg spreading track shown in FIG. 1 is provided with side baffles 10, 11 positioned above the conveyor roller 2 and mutually diverging from strip 8. Steering strips 12 are provided between side baffles 10, 11 and above the conveyor roller. Steering strips 12, which diverge, define conveyor lanes 12' wherein the eggs are displaced uniformly outwards. At the end of the lanes defined by steering strips 12, there are provided transition strips 13, 14. Said strips 13, 14, like strip 18, are disposed with their top faces slightly above the top face of the conveyor roller 2. Strips 13, 14 formed as cross members, and hence also functioning as distributor strips, effect that an egg passes onto the conveyor roller 3 only when the successive eggs in the track concerned between steering strips 12 have built up a sufficient pressure.

Figure 3:
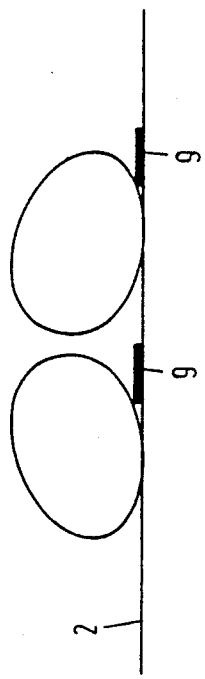
FIG. 3 is a detail cross section on the line III of FIG. 1.

Steering strips 12 in this case, like guide strips 9, are flat and are provided just above conveyor belt 2 (FIG. 3). Strips 12 can also function as distributor strips. In fact, when excessive congestion occurs in a given lane, an egg can be pressed by the eggs coming after them laterally over steering strip 9 into an adjacent lane if this lane is at least less crowded. This too, promotes an optimum distribution of eggs over the carrying surface. The eggs are guided from transition strips 13, 14, by means of conveyor belts 3, 3', into lanes 22 defined by guides 21 disposed above conveyor 3, 3' by means of a bridge piece 23. Ahead of the fixed guides 21, as viewed in the direction of movement, pins 27 are provided above conveyors 3, 3' by means of a bridge piece 26, which pins can be set vibrating through said bridge piece 26 to promote the supply of eggs to lanes 22. This arrangement is described clearly and extensively in the earlier cited Dutch patent application No. 7704938, or the corresponding U.S. Pat. No. 4,276,977.

Upstream of lanes 22, feelers 15, 16 and 17, 18, respectively, are provided laterally above the conveyors 3, 3', which feelers, in the event of congestion, stop or delay feed belts 4, 5 temporarily until the congestion at that location has been removed.

The eggs come off belts 3 and 3' distributed uniformly over tracks 22 and are discharged in known manner by belts 28, 29.

It is observed that, after the foregoing, various modifications of the above described egg spreading track will be readily apparent to one skilled in the art. For instance, the supply of eggs to the egg spreading track can also be effected by a single feed belt or more than two feed belts employed in the above described egg spreading track. It is also possible to effect the discharge of the eggs by a single lane or more than two lanes. The number of feed belts need not necessarily be equal to the number of discharge lanes. Such modifications are deemed to be within the scope of the present invention.

What I claim is:

1. An egg spreading track comprising a carrying surface forming part of one or more endless belts, baffles dividing at least a part of the width of said carrying surface into a plurality of discharge tracks extending along at least a part of the length of said carrying surface, as well as least one cross member arranged directly above said carrying surface, characterized in that at least two side baffles converging in the direction of movement of said carrying surface are provided above said carrying surface, upstream of said cross member, characterized in that one or more guide strips are provided above the carrying surface between the converging side baffles, said strips defining two or more conveyor lanes, characterized in that the guide strips are oriented obliquely inwards in the direction of movement of the carrying surface, wherein the guide strips are disposed directly above the carrying surface so that eggs can roll over these strips.

2. An egg spreading track as claimed in claim 1, characterized in that the angle between the guide strips and the direction of movement of the carrying surface is adjustable.

3. An egg spreading track as claimed in claim 1, characterized in that the guide strips are flat and are disposed directly above the carrying surface.

4. An egg spreading track as claimed in claim 1, characterized in that adjacent the cross member the conveying side baffles pass into side baffles mutually diverging in the direction of movement of the carrying surface.

5. An egg spreading track as claimed in claim 1, characterized in that downstream of the cross member there are provided one or more steering strips above the carrying surface for defining two or more conveyor lanes.

6. An egg spreading track as claimed in claim 5, characterized in that the steering strips are disposed between the side baffles.

7. An egg spreading track as claimed in claim 6, characterized in that the steering strips are oriented obliquely outwards in the direction of movement of the carrying surface.

8. An egg spreading track as claimed in claim 7, characterized in that the steering strips are flat and are provided just above the carrying surface.

9. An egg spreading track as claimed in claim 8, characterized in that a second cross member links up with the converging side baffles, as viewed in the direction of movement.

10. An egg spreading track as claimed in claim 9, characterized in that the steering strips extend in the direction of movement up to a second cross member.

11. An egg spreading track as claimed in claim 10, wherein the carrying surface consists essentially of two or more endless conveyor belts arranged one behind the other in the direction of movement of the eggs, said belts having their top surfaces substantially in co-planar relationship, and with transition strips being provided at the transition point, characterized in that the top faces of said transition strip project slightly above the top faces of the conveyor belts.

12. An egg spreading track comprising a carrying surface forming part of one or more endless belts, baffles dividing at least a part of the width of said carrying surface into a plurality of discharge tracks extending along at least a part of the length of said carrying surface, as well as at least one cross member arranged directly above said carrying surface, characterized in that at least two side baffles converging in the direction of movement of said carrying surface are provided above said carrying surface, upstream of said cross member, characterized in that one or more guide strips are provided above the carrying surface between the converging side baffles, said strips defining two or more conveyor lanes, characterized in that the guide strips are oriented obliquely inwards in the direction of movement of the carrying surface, wherein the guide strips are disposed directly above the carrying surface so that eggs can roll over these strips, and wherein the guide strips are flat.

* * * * *